April 7, 1942.  J. S. PARSONS  2,279,244

NETWORK SYSTEM OF DISTRIBUTION

Filed March 30, 1939  2 Sheets-Sheet 1

WITNESSES:
E. A. McCloskey
C. L. Freedman

INVENTOR
John S. Parsons.
BY
ATTORNEY

April 7, 1942.  J. S. PARSONS  2,279,244
NETWORK SYSTEM OF DISTRIBUTION
Filed March 30, 1939  2 Sheets-Sheet 2

WITNESSES:
E. A. M?Closkey.
C. L. Freedman

INVENTOR
John S. Parsons.
BY
ATTORNEY

Patented Apr. 7, 1942

2,279,244

UNITED STATES PATENT OFFICE 2,279,244

NETWORK SYSTEM OF DISTRIBUTION

John S. Parsons, Swissvale, Pa., assignor to Westinghouse Electric & Manufacturing Company, East Pittsburgh, Pa., a corporation of Pennsylvania Application March 30, 1939, Serial No. 264,932

19 Claims. (Cl. 175—294)

My invention relates to alternating-current distribution systems, and particularly to such systems of the network type, in which a plurality of distribution circuits are connected together to form a distribution network which is supplied by a plurality of feeders. In such systems, whether of the low-voltage or medium-voltage types known in the art, a number of step-down polyphase transformers or banks of single phase transformers are connected between each feeder and the network, and network protectors or automatic switches are connected between the secondary leads of each polyphase transformer or bank of transformers and the network.

It has heretofore been the practice, in such systems, to provide power-directional relay apparatus as part of each network protector, for tripping the network circuit breaker upon the occurrence of power flow from the network to the feeder, and for reclosing the network breaker upon the occurrence of such a relationship of feeder and network voltages as to insure power flow from the feeder to the network upon reclosure of the network breaker. In order to permit the entire disconnection of an individual feeder at times of light load or in the event of a single line-to-ground fault on systems using transformers with their primaries connected in delta, it has been the practice to adjust the power-directional network relays to respond to a reverse power flow of comparatively low value, for example, 0.5% of normal full load, so that upon opening the feeder circuit breaker, the reverse power flow occasioned by magnetizing losses to the network transformers would be sufficient to effect operation of the network relays to open the network breaker and to disconnect the feeder from the network.

With such a sensitive reverse power adjustment, it has been necessary to make an accurate comparison of feeder and network voltages, as to both magnitude and phase position, in order to insure closure of the network circuit breaker only under proper system conditions. The operation of comparing feeder and network voltages is termed "phasing" and accomplishes two things:

First, it prevents the closure of the network circuit breakers in the event that any conductors of the feeder have been transposed or incorrectly connected in repairing a feeder fault. In the absence of such phasing protection, such a reclosure would create a dangerous condition on the system, which probably could not be cleared by the network protectors and possibly not by the feeder breakers.

Second, the phasing operation serves to prevent repeated opening and closing, or "pumping," of the network protectors, in the event that both the feeder and network are energized, but the relationship of the feeder and the network voltages is such that, upon closure of the protectors, power would flow in a reverse direction through them.

The phasing operation of the usual network master relay is often insufficient alone to prevent pumping, and it may be necessary to add an additional phasing relay to protectors in some network systems to limit the range of feeder voltages, as compared to network voltage, within which reclosure can take place.

In order to meet the requirements of accurate measurement of power flow and accurate comparison of voltages necessary in the system described above, as well as to permit reclosure of the protectors when the network is either totally deenergized or normally energized, a rather complicated and expensive form of network protector is necessary.

As alternatives to the sensitive power-directional arrangement described above, a number of simplified systems may be employed. According to one such system, it is proposed to reclose the protectors in response to feeder voltage only, and to provide means for locking a protector circuit breaker in open position, after it has been opened, until the feeder is completely deenergized. In this way pumping may be avoided, as the protectors first to open cannot reclose until all the other protectors connected to the feeder have opened. However, this arrangement provides no protection against crossed phase connections, and it would be necessary, after repairing a feeder fault, to block open all of the protectors supplied from the feeder before closing the feeder breaker. The voltages across a number of the open protectors would then be checked by means of a voltmeter before putting the feeder back into service.

In order to avoid the necessity for the checking operation, I provide a simple relay arrangement to determine the condition of the feeder circuit and of the transformer in order to permit the closing of the network circuit breaker to reconnect the transformer to the network only when the feeder circuit and transformer are in sound condition and are free of transposed or rotated conductors relative to the corresponding conductors of the network.

In this simplified system I utilize a relay connected between ground and one conductor of the high tension feeder to the transformer. For example, the relay may be electrostatically coupled to the conductor according to the principles disclosed in United States Patent No. 2,020,931 of M. A. Bostwick et al., assigned to the Westinghouse Electric & Manufacturing Company. This ground relay is employed to detect a faulty ground condition on the feeder, as well as an arbitrary artificial ground condition purposely imposed to operate the network circuit breakers of that feeder.

It is a further object of my invention to provide a precautionary protective feature to prevent attempted closure of any network circuit breaker when the feeder and the transformer are normally sound, if the ground relay has become non-operative due to some internal defects such as an open circuit.

An additional object of my invention, therefore, is to provide a protective lockout feature that will prevent closure of the network circuit breaker after it has been opened, if the ground detecting relay is not functioning properly, even though the feeder circuit and the associated transformer are in sound condition and are normally operative.

Another object of my invention is to provide a network control system in which a minimum of control equipment will be connected to the low-voltage side of the network transformer, thereby to diminish the amount of equipment normally mounted with the network circuit breaker.

A further object of my invention is to place the impedance of a transformer between a tripping relay responsive to a polyphase quantity and a network distribution circuit.

A still further object of my invention is to include energizing means for control apparatus in a network transformer.

Another object of my invention is to provide a simplified form of protective apparatus for a network system that shall provide reasonable protection of the system at a relatively low cost compared to the cost of the highly sensitive types of protective equipment heretofore employed.

A further object of my invention is to provide protection against phase-to-phase feeder faults by means of a voltage relay.

The arrangement of the simplified equipment to provide the protection for a network system in accordance with the principles of my invention is illustrated in the accompanying diagrams, in which Figure 1 is a single line diagram showing how a main feeder supplies a network through several transformers and circuit breaker units;

Figure 1:
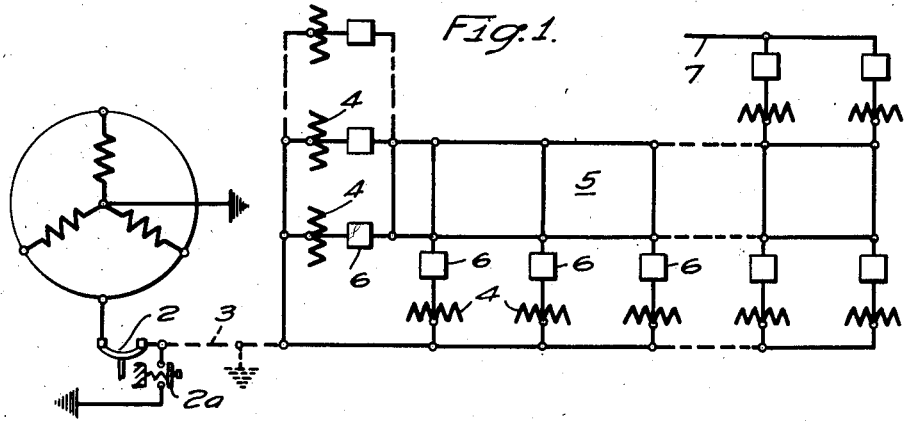

As shown in Fig. 1, a polyphase grounded-neutral medium voltage source 1, which may be a generating station or substation bus, is connected by means of a feeder circuit breaker 2 to a feeder 3. The feeder circuit breaker 2 is equipped with the usual control apparatus for causing it to open in the event of a fault on the feeder 3. As such apparatus is well known in the art and forms no part of the present invention, it has not been illustrated in the drawings. It will be assumed, however, that regardless of the form of control apparatus provided for the feeder breaker 2, the latter is locked out in the event of a permanent fault on the feeder 3. In order to operate the network protectors properly when the breaker 2 is opened manually, a manually operated switch 2a is provided for grounding directly or through an impedance one conductor of the feeder 3.

A plurality of banks of transformers 4 are connected to the feeder 3, for supplying power to a polyphase network 5, in accordance with the usual practice. The banks of transformers 4 are preferably connected in delta on the feeder or high-voltage side and in star, with neutral grounded, on the network side, but may be connected in other ways familiar to those skilled in the art. A plurality of network protectors 6 are interposed between the transformer banks 4 and the network 5 in the usual manner, and the network 5 is supplied from the source 1 by means of one or more other feeders, as indicated fragmentarily at 7.

Figure 2:
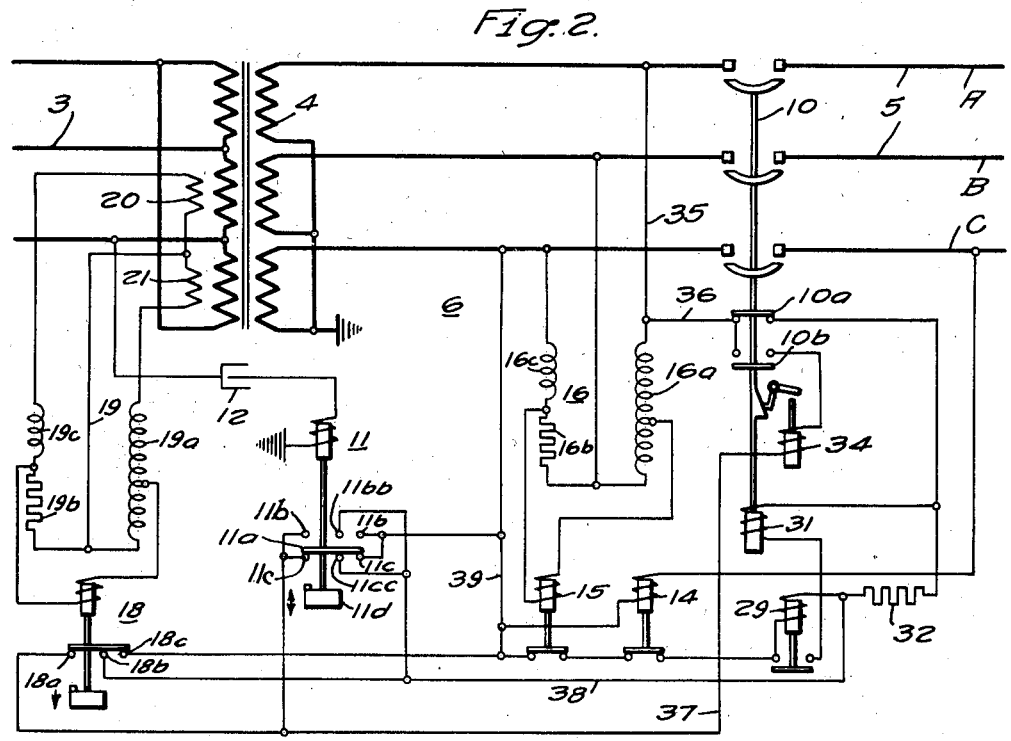
Fig. 2 is a diagram of a transformer and its circuit breaker together with their associated control equipment.

Referring to the diagram in Fig. 2, which shows a network protector 6 associated with a delta-star transformer bank 4, the network protector 6 consists of a network circuit breaker 10, and suitable control apparatus for the network circuit breaker 10. Such apparatus includes a ground relay 11, a voltage-responsive relay 14 for phasing, a negative phase-sequence voltage relay 15, and a positive phase-sequence relay 18 for protecting against phase-to-phase or three phase faults.

The ground relay 11 and the positive phase-sequence relay 18 may be electrostatic relays or electromagnetic relays. As shown, the relay 11 is connected by means of a capacitor 12 to a high-voltage terminal of the transformer bank 4.

The ground relay 11 is provided with a movable contact member 11a, front contact members 11b and 11bb, and back contact members 11c and 11cc. This relay is so designed that the movable contact member 11a engages the front contact members 11b and 11bb in response to a voltage condition of approximately 140% of the normal line-to-neutral voltage of the feeder 3, and engages the back contact members 11c and 11cc in response to an under-voltage condition of approximately 30% normal line-to-neutral voltage. A dash-pot 11a provides a time delay of about one second in each direction.

The voltage responsive relay 14 and the negative phase-sequence voltage relay 15 are provided for controlling the closure of the breaker 10 in the event of an abnormal relationship of feeder and network voltages. The voltage responsive relay 14 is connected across the main contact members of the associated circuit breaker 10, and is designed to operate at a voltage value of approximately 130% of normal phase-to-neutral voltage of the low-voltage network. The purpose of this relay is to prevent the switch 10 from closing in the event that all three conductors of the feeder have been rotated 120° or 240° in repairing a feeder fault.

The negative phase-sequence voltage relay 15 is connected to a negative phase-sequence voltage filter 16 to be energized in accordance with the negative symmetrical components of the polyphase voltage appearing across the secondary terminals of the transformer bank 4.

The negative phase-sequence voltage filter 16 is preferably of the type disclosed in the U. S. patent of B. E. Lenehan, No. 1,936,797, and comprises an auto-transformer 16a having a 40% tap, and a resistor 16b and reactor 16c having a combined lagging phase angle of 60°. The impedances of the resistor 16b and of the reactor 16c are so related that the voltage appearing across the resistor 16b is equal to 40% of the total voltage impressed upon the resistor 16b and reactor 16c in series, and the voltage across the resistor lags said total voltage by a phase angle of 60°. With this arrangement, the voltage impressed upon the negative phase-sequence voltage relay 15 is proportional to the negative symmetrical components of the voltage applied to the terminals of the filter 16, as explained in the above-mentioned Lenehan patent. To measure the negative phase-sequence component of voltage, the conductors A—B—C of the network should be connected as shown, the phase rotation of the power system being A—B—C.

The negative phase-sequence voltage relay 15 is designed to have a pick-up setting proportional to 25% of normal line-to-neutral voltage, and a drop-out setting of 15% of normal line-to-neutral voltage. If any two conductors of the feeder 3 should have been transposed in repairing a feeder fault, a negative phase-sequence voltage of considerably higher value than 25% normal positive-sequence voltage would be impressed upon the negative phase-sequence voltage relay 15, and the latter would operate to open its contacts. The relay 15 also operates in the event that any single feeder conductor has been left open in repairing a feeder fault. The case of two conductors of the feeder 3 being open need not be provided for, as no short-circuit would occur upon closure of a network protector under these conditions.

In order to trip the network breaker in case of a phase-to-phase or three-phase fault on the feeder circuit 3, the undervoltage relay 18 is provided to measure the positive phase-sequence voltage on the feeder 3, and that relay is energized from the network transformer 4 through a positive phase-sequence filter 19 energized from two low-voltage, auxiliary windings 20 and 21 in the network transformer, which are connected in open delta.

Figure 3:
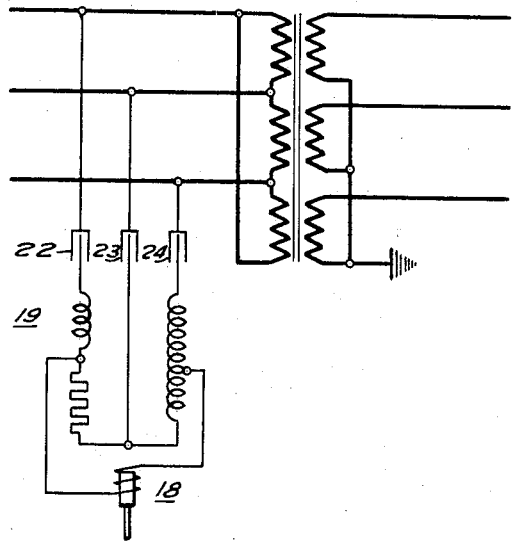
Fig. 3 is a diagram showing a different arrangefor connecting a fault-responsive control device to the feeder circuit.

Instead of the auxiliary windings 20 and 21 of the network transformer, coupling capacitors 22, 23 and 24 may be employed as illustrated in the small diagram in Fig. 3, or an auxiliary transformer may be employed for energizing the filter 19.

The positive phase-sequence voltage filter 19 is also of the type disclosed in the U. S. patent to Lenehan 1,936,797, referred to above, and comprises similar elements, such as the auto-transformer 19a with a 40% tap, the resistor 19b and the reactor 19c, the resistor and the reactor 19c having the same relationship as in the filter 16. Since in this case, however, the positive phase-sequence component is measured instead of the negative component, as through the filter 16, the conductors should be connected with opposite phase rotation to filter 16.

The undervoltage relay 18 that is energized from the positive phase-sequence voltage filter 19 is provided with three back contacts 18a, 18b and 18c and with a time-delay attachment or control, illustrated schematically as a dashpot, in order to introduce a time delay of about one second in closing the contacts upon diminished energization to or below the drop-out value, which may be set at 70% of normal positive sequence voltage.

Referring to the diagram, the operation of the system as a whole may be set forth as follows: To disconnect manually the feeder 3, the feeder breaker 2 is opened. Upon opening of the feeder breaker 2, one of the phase conductors, such as the C-phase conductor, of the feeder 3 is grounded through the manually operated switch 2a. In response to the under-voltage condition produced on the C-phase conductor of the feeder 3, the ground relays 11 of all of the network protectors 6 operate to trip open the corresponding breakers. In this way the feeder 3 is entirely disconnected from the network.

If the feeder breaker 2 is reclosed, the source 1 is again connected to the feeder 3, thereby rendering the phase-to-ground voltage of each of the conductors of the feeder 3 approximately normal. In response to such normal voltage, the movable armature of the ground relay 11 disengages the lower contact members and assumes its normal intermediate floating position between the upper contacts and the lower contacts, and out of engagement with both groups of contacts.

If the condition of the feeder is otherwise normal and sound, and if the transformer is also sound and the conductors are not transposed or rotated from normal phase relationship to the network conductors, the voltages impressed upon the negative phase-sequence filter 16 will be relatively normal and hence less than 15% of normal line-to-neutral voltage at which the negative phase-sequence relay 15 is adjusted to drop out. The relay 15 will thus drop out to close its back contacts which are connected in series with the back contacts of the co-operating phasing relay 14, whose coil is connected across the C-phase terminals or conductors of the network circuit breaker. This phasing relay 14 is adjusted to have a pick-up setting of 140% normal line-to-neutral voltage and a drop-out setting of 115% of normal line-to-neutral voltage. This phasing relay will open its contacts if the conductors are phase rotated, from normal, in proper phase rotation.

The contacts of the negative phase sequence relay 15 and those of the phasing relay 14 are connected in series to control the energizing circuit of a closing control relay 29 that controls the energizing circuit to the closing coils 31 for the circuit breaker 10. The circuit of the operating coil of the motor control relay 29 includes a limiting resistor 32 to limit the current in that circuit when the operating coil of motor control relay 29 is short-circuited through the contacts of the ground relay 11, or of relay 18. The relay 29 may be so adjusted that when connected to a feeder it will close its contacts only if the feeder voltage is high enough to assure positive operation of the closing solenoid or motor 31.

The energizing circuit for the closing control relay 29 is completed through a back contact 10a on the circuit breaker 10, so that the circuit for that relay may be opened to deenergize the relay 29 when the breaker is moved to final closed position. That construction feature is standard practice, and is not illustrated in complete detail here. In the closed position the circuit breaker 10 closes an auxiliary front contact 10b, through which its trip coil 34 may be energized to open the switch. The trip circuit may be traced from the main circuit conductor A through conductors 35 and 36, the auxiliary contact 10b, the trip coil 34, conductor 37 and the contacts of ground relay 11 or undervoltage relay 18 to main conductor C.

If a phase-to-ground fault occurs on the C-phase conductor of feeder 3, the voltage-to-ground of the latter conductor falls below the 30% value to which the ground relays 11 respond, and the associated circuit breakers 10 are tripped open after the expiration of the time delay of the relays 11.

If, in repairing the feeder fault, any two of the conductors of the feeder 3 should be transposed, or if all three feeder conductors should be rotated 120° or 240°, or if one conductor of the feeder should be left open, the circuit breaker 10 would not be reclosed. The rotation of the feeder conductors without disturbance of the order of phase rotation would be detected by the phasing relay 14 which would be energized by the out-of-phase voltage across the two C-conductor terminals of the breaker, and which would open its contacts to hold the circuit of the closing control relay 29 open, and thus would prevent operation of that relay 29 and of the closing coil 31 until the rotated condition of the feeder conductors were corrected.

The open-phase condition of one of the feeder conductors or the transposition of two conductors would be detected by the negative phase-sequence voltage relay 15, which would be sufficiently energized under that condition to open its contacts to hold the circuit of the closing control relay 29 open and deenergized. The operation of the relays 14 and 15, and certain other apparatus is described more fully in my copending application, Serial No. 128,203, filed February 27, 1937, of which this is a continuation-in-part. This application has matured into Patent No. 2,162,516.

So long as conditions in the feeder are normal and the feeder is free of any two phase or three phase short-circuit condition, the positive phase-sequence relay 18 is sufficiently energized through the filter 19 to open its contacts to prevent energization of the trip coil of the circuit breaker so that the breaker will not be tripped open.

It should be noted that a tripping circuit for the circuit breaker 10 is completed independently by any of three pairs of contacts. If a phase-to-ground fault occurs on either of the feeder conductors A or B, the voltage which actuates the relay 11 increases to a value above 140% of its normal value, and the movable contact 11a engages the contacts 11b to complete a tripping circuit for the circuit breaker after the expiration of the relay time delay. The purpose of this time delay is to permit tripping of the feeder circuit breaker on a faulty feeder before any network circuit breaker is tripped. This prevents false operation of network circuit breakers connected to sound feeders. At the same time, the movable contact 11a engages the auxiliary contact 11bb to complete a shunt path for the closing relay 29. This prevents repeated reclosures or "pumping" of the circuit breaker 10 while the relay 11 is in tripping condition. The shunt path may be traced from the contact 11bb through a conductor 38, the operating coil of the relay 29, the contacts of the relays 14 and 15, a conductor 39, one of the contacts 11b and the movable contact 11a back to the auxiliary contact 11bb.

If a phase-to-ground fault occurs on the feeder phase conductor C, the voltage which actuates the relay 11 falls to a value below 30% of its normal value, and the movable contact 11a engages the contacts 11c, 11cc after the expiration of the relay time delay. The contacts 11c are connected to the contacts 11b and operate in the same manner to complete a tripping circuit for the circuit breaker 10 when bridged by the movable contact 11a. The contact 11cc is connected to the auxiliary contact 11bb and operates in the same manner to shunt the operating coil of the relay 29 when the movable contact 11a bridges the contacts 11c, 11cc.

Finally when a two or three phase fault occurs on the feeder 3, the positive sequence voltage drops sufficiently to permit the relay 18 to close its contacts 18a, 18b, 18c after expiration of its time delay. The contacts 18a and 18c are connected in parallel with the contacts 11b and operate similarly when bridged, to complete a tripping circuit for the circuit breaker 10. The contact 18b is connected to the contact 11bb and operates similarly when the relay 18 is in tripping position to establish a shunt path for the closing coil of the relay 29.

Because of these auxiliary contacts 11bb, 11cc and 18b, if the relay 11 or 18 becomes defective because of an open circuited operating coil, improper connections or other reasons, the circuit breaker 10 will not "pump" continuously, but will trip once and remain tripped.

Although the relay 11 may be replaced by an undervoltage relay which drops out when the voltage from the feeder phase conductor C to ground falls below 30% of its normal value to connect the three contacts 11c, 11cc, and an overvoltage relay which picks up when the same voltage increases to a value over 140% of its normal value to engage the three contacts 11b, 11bb, the "floating" type of relay 11 appears simpler and preferable.

Figure 4:
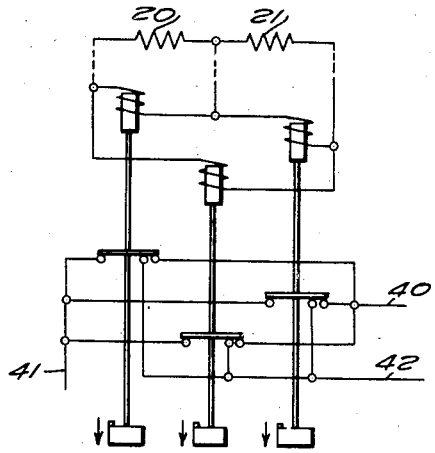
Fig. 4 is a diagrammatic view of a modified relay system designed in accordance with my invention.

The positive sequence filter 19 and relay 18 may be replaced by three undervoltage relays connected to the transformer windings 20 and 21 as shown in Fig. 4. Each of the relays is provided with three contacts which are connected respectively to the conductors 40, 41 and 42. These conductors correspond respectively to the conductors attached to the contacts 18a, 18b and 18c of Fig. 2. Because of the greater simplicity, the filter 19 and relay 18 are considered preferable.

If a fault occurs on the network 5, the fault is burned off in the usual manner. As the impedance of a network transformer, such as shown at 4, is invariably high as compared to the impedance of a feeder, such as feeder 3, the feeder voltage is not greatly reduced in the event of any form of network fault. In the case of the most severe network faults, such as phase-to-phase or three-phase short circuits close to the transformers, the feeder voltage may fall to a value of the order of 50% of normal and the positive-sequence voltage of the feeder to about 80% of normal. However, as the relays 11 and 18 trip only on under-voltage conditions below these values, none of these relays operate; and the protectors 6 all remain closed.

It will be noted that the protector controls are all determined by voltages, and by simple voltage responsive relays. No current transformer is required.

The energization of the filter 19 could be derived through an auxiliary voltage transformer from the system, but apparatus simplicity is aided by employing tertiary windings in the transformer 4. As before indicated, the electrostatic coupling of Fig. 3 also is suitable.

By placing the impedance of a transformer, such as the transformer 4, between the relay 18 and the distribution circuit 5, a relay 18 associated with a sound feeder circuit is influenced less by low distribution circuit voltages, such as those accompanying certain faults on a distribution circuit or adjacent feeder circuits. Consequently, false operations of relay equipment on sound feeders are practically eliminated.

Although the filter 19 may be designed to respond to a negative-sequence voltage, and relay 18 may be designed to pick-up and close the contacts 18a, 18b, 18c when the negative-sequence voltage exceeds a predetermined value, I prefer the positive-sequence responsive relay for the reason that the latter is effective for tripping the circuit breaker when three phase balanced faults occur.

I do not intend that the present invention shall be restricted to the specific structural details, arrangement of parts or circuit connections herein set forth as various modifications thereof may be effected without departing from the spirit and scope of my invention. I desire, therefore, that only such limitations shall be imposed as are indicated in the appended claims.

I claim as my invention:

1. In a polyphase electrical network distribution system, a polyphase source of electrical energy, transformer means, a distribution circuit connected for energization from said polyphase source through said transformer means, a circuit interrupter for operatively disconnecting said distribution circuit from said source, a relay responsive to the positive sequence voltage component on the source side of said transformer for tripping said circuit interrupter when said component falls below a predetermined value, means for closing said circuit interrupter, and means for rendering said closing means ineffective while said relay is in tripping condition.

2. In a polyphase electrical network distribution system, a polyphase source of electrical energy, transformer means, a distribution circuit connected for energization from said polyphase source through said transformer means, and means responsive independently to the deviation of a voltage between a primary terminal of said transformer means and ground from a predetermined range of values and to a symmetrical component of an electrical quantity on the source side of said transformer means for operatively disconnecting said distribution circuit from said source.

3. In a polyphase electrical network distribution system, a polyphase source of electrical energy, transformer means, a distribution circuit connected for energization from said polyphase source through said transformer means, a circuit interrupter for operatively disconnecting said distribution circuit from said source, and means responsive independently to the deviation of a voltage between a primary terminal of said transformer means and ground from a predetermined range of values and to the positive sequence voltage component on the source side of said transformer when said component falls below a predetermined value for tripping said circuit interrupter.

4. In a polyphase electrical network distribution system, a polyphase source of electrical energy, transformer means, a distribution circuit connected for energization from said polyphase source through said transformer means, a circuit interrupter for operatively disconnecting said distribution circuit from said source, means responsive independently to the deviation of a voltage between a primary terminal of said transformer means and ground from a predetermined range of values and to the positive sequence voltage component on the source side of said transformer when said component falls below a predetermined value for tripping said circuit interrupter, means for closing said circuit interrupter, and means for rendering said closing means ineffective while said tripping means is in tripping condition.

5. In a polyphase electrical network distribution system, a polyphase source of energy, a polyphase transformer unit, a distribution circuit connected for energization from said source through said transformer unit, a positive sequence voltage filter energized from the source side of said transformer unit, means for disconnecting said distribution circuit from said source, and means responsive to a decrease in the output of said voltage filter below a predetermined value for controlling said disconnecting means.

6. In a polyphase electrical network distribution system, a polyphase source of energy, a polyphase transformer unit, a distribution circuit connected for energization from said source through said transformer unit, a positive sequence voltage filter energized from the source side of said transformer unit, a circuit interrupter for operatively disconnecting said distribution circuit from said source, means responsive to a decrease in the output of said voltage filter below a predetermined value for tripping said circuit interrupter, means for closing said circuit interrupter, and means for rendering said closing means ineffective while said tripping means is in tripping condition.

7. In a polyphase electrical network distribution system, a polyphase source of energy, a polyphase transformer unit, a distribution circuit connected for energization from said source through said transformer unit, a positive sequence voltage filter energized from the source side of said transformer unit, a circuit interrupter for operatively disconnecting said distribution circuit from said source, means responsive independently to the deviation of a voltage between a primary terminal of said transformer unit and ground from a predetermined range of values and to a decrease in the output of said voltage filter below a predetermined value for operatively disconnecting said distribution circuit from said source.

8. In a polyphase electrical network distribution system, a polyphase source of energy, a polyphase transformer unit, a distribution circuit connected for energization from said source through said transformer unit, a circuit interrupter for operatively disconnecting said distribution circuit from said source, closing means for said interrupter, tripping means for said interrupter, a positive sequence voltage filter energized from the source side of said transformer unit, a relay controlled by the voltage between a primary terminal of said transformer unit and ground, and a second relay controlled by the output of said voltage filter, each of said relays having contact means for independently controlling the energization of said tripping means and simultaneously rendering said closing means ineffective.

9. In a polyphase electrical network distribution system, a polyphase source of electrical energy, transformer means, a distribution circuit connected for energization from said polyphase source through said transformer means, a circuit interrupter for operatively disconnecting said distribution circuit from said source, means responsive to the positive sequence voltage component on the source side of said transformer for tripping said circuit interrupter when said component falls below a predetermined value, means for closing said circuit interrupter, means for rendering said closing means ineffective while said tripping means is in tripping condition, and means for rendering said closing means ineffective when the voltages across said circuit interrupter fail to assure a proper transfer of power from said source to said distribution circuit.

10. In a polyphase electrical network distribution system, a polyphase source of electrical energy, transformer means, a distribution circuit connected for energization from said polyphase source through said transformer means, a circuit interrupter for operatively disconnecting said distribution circuit from said source, means responsive independently to the deviation of a voltage between a primary terminal of said transformer means and ground from a predetermined range of values and to the positive sequence voltage component on the source side of said transformer for tripping said circuit interrupter when said component falls below a predetermined value, means for closing said circuit interrupter, means for rendering said closing means ineffective while said tripping means is in tripping condition, and means for rendering said closing means ineffective when the voltages across said circuit interrupter fail to assure a proper transfer of power from said source to said distribution circuit.

11. In an alternating-current polyphase network distribution system, the combination with a transformer connected to a feeder, and a circuit breaker to connect the transformer to a network, and provided with closing means and tripping means for the breaker, of means responsive to a ground fault condition on the feeder to energize the tripping means, means responsive to a sound energy-delivering condition of the feeder to operate the closing means, and means connected to the feeder and responsive to a positive phase-sequence voltage quantity on the feeder circuit for controlling the operation of the closing means according to the value of such positive phase-sequence voltage quantity.

12. In an alternating-current network distribution system, the combination with a transformer connected to a feeder, and a circuit breaker to connect the transformer to the network, and provided with closing means and tripping means for the breaker, of means responsive to a negative phase-sequence voltage on the feeder side of said circuit breaker and cooperating means responsive to proper phase conditions between the transformer and the network for permitting or preventing the operation of the closing means for the breaker, and means responsive to a predetermined value, below normal, of the positive phase-sequence voltage on the feeder side of the transformer, for preventing operation of the closing means when said closing means is otherwise permitted to operate.

13. In a polyphase network distribution system, a polyphase source of electrical energy, a transformer unit having primary windings connected for energization from said source, main secondary windings and auxiliary tertiary windings, a polyphase distribution circuit connected for energization from said main secondary windings, a circuit interrupter for operatively disconnecting said distribution circuit from said source, and means responsive to a symmetrical component of a polyphase voltage derived from said auxiliary tertiary windings for controlling said circuit interrupter.

14. In a polyphase network distribution system, a polyphase source of electrical energy, a transformer unit having primary windings connected for energization from said source, main secondary windings and auxiliary tertiary windings, a polyphase distribution circuit connected for energization from said main secondary windings, a circuit interrupter for operatively disconnecting said distribution circuit from said source, a positive sequence voltage filter energized from said tertiary windings, and means responsive to the output of said filter for tripping said circuit interrupter.

15. In a polyphase network distribution system, a polyphase source of electrical energy, a transformer unit having primary windings connected for energization from said source, main secondary windings and open delta auxiliary tertiary windings, a polyphase distribution circuit connected for energization from said main secondary windings, a circuit interrupter for operatively disconnecting said distribution circuit from said source, a positive sequence voltage filter energized from said tertiary windings, means responsive to the output of said filter for tripping said circuit interrupter, closing means for said circuit interrupter, and means for making said closing means ineffective while said tripping means is in tripping condition.

16. In a polyphase electrical network distribution system, a polyphase source of electrical energy, transformer means, a distribution circuit connected for energization from said polyphase source through said transformer means, and means responsive independently to the deviation of a voltage between a primary terminal of said transformer means and ground from a predetermined range of values and to a symmetrical component of an electrical quantity on the source side of said transformer means for operatively disconnecting said distribution circuit from said source, said disconnecting means being effective only if the condition to which it responds exists for a predetermined time interval.

17. In a polyphase electrical network distribution system, a polyphase source of energy, a polyphase transformer unit, a distribution circuit connected for energization from said source through said transformer unit, a positive sequence voltage filter energized from the source side of said transformer unit, a circuit interrupter for operatively disconnecting said distribution circuit from said source, means responsive independently to the deviation of a voltage between a primary terminal of said transformer unit and ground from a predetermined range of values and to a decrease in the output of said voltage filter below a predetermined value for operatively disconnecting said distribution circuit from said source, said disconnecting means being effective only if the condition to which it responds exists for a predetermined time interval.

18. In a network distribution system, a source of electrical energy, a transformer unit having primary windings connected for energization from said source, main secondary windings and auxiliary tertiary windings, a distribution circuit connected for energization from said main secondary windings, a circuit interrupter for operatively disconnecting said distribution circuit from said source, and means energized from said auxiliary tertiary windings for tripping said circuit interrupter, said tripping means being effective only if a tripping condition exists for a predetermined time.

19. In a polyphase network distribution system, a polyphase source of electrical energy, a transformer unit having primary windings connected for energization from said source, main secondary windings and auxiliary tertiary windings, a polyphase distribution circuit connected for energization from said main secondary windings, a circuit interrupter for operatively disconnecting said distribution circuit from said source, a positive sequence voltage filter energized from said tertiary windings, and means responsive to the output of said filter for tripping said circuit interrupter, said tripping means being effective only if a tripping condition exists for a predetermined time.

JOHN S. PARSONS.